(12) United States Patent
Brey et al.

(10) Patent No.: US 7,309,513 B2
(45) Date of Patent: Dec. 18, 2007

(54) BROAD SPECTRUM FILTER SYSTEM INCLUDING TUNGSTEN-BASED IMPREGNANT AND BEING USEFUL FOR FILTERING CONTAMINANTS FROM AIR OR OTHER GASES

(75) Inventors: Larry A. Brey, Woodbury, MN (US); Simon J. Smith, Glenburnie (CA); Glenn E. Weagle, Mallorytown (CA)

(73) Assignee: 3M Innovative Properties Company, St. Paul, MN (US)

( * ) Notice: Subject to any disclaimer, the term of this patent is extended or adjusted under 35 U.S.C. 154(b) by 330 days.

(21) Appl. No.: 11/106,273

(22) Filed: Apr. 14, 2005

(65) Prior Publication Data

US 2005/0183577 A1 Aug. 25, 2005

Related U.S. Application Data

(62) Division of application No. 10/606,548, filed on Jun. 26, 2003, now Pat. No. 7,004,990.

(51) Int. Cl.
B01D 20/20 (2006.01)
(52) U.S. Cl. ............... 427/212; 427/244; 427/350; 427/372.2; 55/DIG. 5
(58) Field of Classification Search ............. 55/524, 55/DIG. 33, DIG. 5; 96/132, 135, 153; 95/285; 502/417; 427/212, 244, 350, 372.2
See application file for complete search history.

(56) References Cited

U.S. PATENT DOCUMENTS

| | | | |
|---|---|---|---|
| 293,962 A | 2/1884 | Gyles | |
| 1,519,470 A | 12/1924 | Wilson et al. | |
| 1,956,585 A | 5/1934 | Oglesby et al. | |
| 2,511,288 A | 6/1950 | Morrell et al. | |
| 2,920,050 A | 1/1960 | Blacet et al. | |
| 2,920,051 A | 1/1960 | Wiig et al. | |
| 3,355,317 A | 11/1967 | Keith, II et al. | |
| 3,436,352 A | 4/1969 | Revoir et al. | |
| 4,212,852 A | 7/1980 | Aibe et al. | |
| 4,443,354 A | 4/1984 | Eian | |
| 4,677,096 A | 6/1987 | van der Smissen | |
| 4,801,311 A | 1/1989 | Tolles | |
| 4,802,898 A | 2/1989 | Tolles | |
| 5,063,196 A | 11/1991 | Doughty et al. | |
| 5,113,856 A | 5/1992 | van der Smissen | |
| 5,145,820 A | 9/1992 | Liang et al. | |
| 5,192,735 A | 3/1993 | Pagotto et al. | |
| 5,197,208 A | 3/1993 | Lapidus | |
| 5,231,063 A * | 7/1993 | Fukumoto et al. | 502/62 |
| 5,320,817 A * | 6/1994 | Hardwick et al. | 423/237 |
| 5,344,626 A * | 9/1994 | Abler | 423/210 |
| 5,492,882 A * | 2/1996 | Doughty et al. | 502/417 |
| 5,496,785 A * | 3/1996 | Abler | 502/180 |
| 5,714,126 A * | 2/1998 | Frund | 422/122 |
| 5,792,720 A * | 8/1998 | Ro et al. | 502/180 |
| 6,344,071 B1 * | 2/2002 | Smith et al. | 95/274 |

FOREIGN PATENT DOCUMENTS

| | | |
|---|---|---|
| CZ | 149995 | 9/1973 |
| CZ | 175003 | 4/1977 |
| DE | 1087579 | 8/1960 |
| DE | 3231717 | 3/1984 |
| EP | 0 370 141 A1 | 5/1990 |
| EP | 0 405 404 A1 | 1/1991 |
| FR | 1605363 | 2/1975 |
| FR | 2728476 | 6/1996 |
| FR | 2764518 | 12/1998 |
| GB | 2 010 794 A | 4/1979 |
| GB | 2 187 725 A | 9/1987 |
| JP | 73-24984 | 3/1973 |
| WO | WO 93/10896 | 6/1993 |
| WO | WO 96/22823 | 8/1996 |
| WO | WO 98/31460 | 7/1998 |
| WO | WO 02/092223 A1 | 11/2002 |

OTHER PUBLICATIONS

Goshorn, J.C., "Use of Adsorbents for Protection Against Ammonia," *The Journal of Industrial Hygiene and Toxicology*, vol. 30, No. 3, pp. 201-204, 1948.

Grabenstetter, R.J. et al., Military Problems with Aerosols and Nonpersistent Gases, Chapter 4: Impregnation of Charcoal, Division 10 Report of US National Defense Research Committee, pp. 40-87 (1946).

Müschenborn, H., "The physiological action of ammonia on man and means of protection against it," Draeger-Hefte, No. 190, 3503-6 (1937), Abstract Only.

Sugiura, M. et al., "Simultaneous removal of acetaldehyde ammonia and hydrogen sulphide from air by active carbon impregnated with $p$-aminobenzoic acid, phosphoric acid and metal compounds," *Journal of Materials Science*, vol. 29, pp. 682-687, 1994.

* cited by examiner

*Primary Examiner*—Frank M. Lawrence
(74) *Attorney, Agent, or Firm*—David B. Kagan; Karl G. Hanson

(57) ABSTRACT

Filter systems that are effective against a broad range of contaminants including HCN, cyanogen chloride (CK), acid contaminants. and basic contaminants such as ammonia without the need (but with the option, if desired) for using molybdenum or chromium containing materials. The filtering systems of the present invention include a tungsten-based material and other impregnants incorporated into a substrate such as filter media particles.

8 Claims, No Drawings

BROAD SPECTRUM FILTER SYSTEM INCLUDING TUNGSTEN-BASED IMPREGNANT AND BEING USEFUL FOR FILTERING CONTAMINANTS FROM AIR OR OTHER GASES

This application is a divisional of U.S. Ser. No. 10/606,548, filed Jun. 26, 2003, now U.S. Pat. No. 7,004,990, the disclosure of which is herein incorporated by reference.

FIELD OF THE INVENTION

This invention relates to filter media used to remove contaminants from air or other gases. More particularly, the invention relates to such media that incorporate at least one kind of filter media particles that incorporate tungsten-containing material(s) and other impregnants in order to provide broad spectrum filtering performance.

BACKGROUND OF THE INVENTION

Extended surface area substrate particles, such as activated carbon, alumina, zeolites, and the like, are widely used in air filtration because of the ability of such materials to remove a wide range of different materials. The filtration characteristics of these materials arises from a highly porous or convoluted surface structure. In the case of activated carbon, the surface porosity results from controlled oxidation during the "activation" stage of manufacture. Activated carbon has been used for air filtration for many decades.

The ability of the carbon to remove a contaminant from the air by direct adsorption depends on a molecular-scale interaction between a gaseous molecule and the carbon surface. The extent of this interaction depends upon factors that include the physical and chemical surface characteristics of the carbon, the molecular shape and size of the gaseous compound, the concentration of the gaseous compound in the gas stream to be filtered, residence time in the carbon bed, temperature, pressure, and the presence of other chemicals. As a rule of thumb, for a single contaminant, the extent of adsorption is primarily dependent on boiling point. In general, the higher the boiling point, the greater the capacity of carbon to remove the chemical.

Accordingly, carbon does not have a great capacity by itself to remove lower boiling point gases. Treatments have been devised in which chemicals are coated on the carbon to provide filtering capabilities towards lower boiling point gases. These treatments are generally known as "impregnation" methods, and the result of treatment is an "impregnated" carbon.

Over the course of this century, development of impregnation techniques has progressed so that a variety of impregnants are available for removing a wide range of different chemicals. Progress has been accelerated during wartime, when actual and perceived threats spurred the development of specialized carbons. However, there has hitherto been a distinction between the types of filter media particles used for military applications, and those used in industrial applications. Military requirements have made it necessary for filter media particles to be capable of removing a range of chemicals, and so multi-component impregnation formulations have been devised. In industry, where the nature of hazards is known in advance, the practice has been to select a filter appropriate to the known hazard. Consequently, filters with capability toward a specific type of chemical or class of chemicals have developed for industrial applications.

Over time, regulatory structures for the selection and use of respiratory protective equipment have evolved, along with approvals systems to ensure that designs of equipment on the market are capable of meeting necessary performance requirements. Such approvals systems have been generated for industrial purposes across international boundaries. These include the European Norm system that is adopted widely in Europe and elsewhere in the world. Another example are the approvals requirements of the US National Institute for Occupational Safety and Health that have been adopted in the USA, Canada and certain other countries. For military requirements, performance specifications are determined by each national need, although there are some internationally agreed upon standards under the North Atlantic Treaty Organisation.

The first U.S. patent for a treatment of carbon to remove a variety of military gases derived from developments to protect personnel in World War I battles in which chemical agents were used in excess. The patent by Joshua C. Whetzel and R. E. Wilson (U.S. Pat. No. 1,519,470, 1924) described the use of an ammoniacal solution of copper carbonate to impregnate a granular activated carbon. This technique became known as "Whetlerization", and the carbon product "Whetlerite". Variations on this technique have been developed over time. (U.S. Pat. Nos. 2,920,050, 2,920,051, DE 1,098,579, FR 1,605,363, JP 7384,984, CZ 149,995).

During World War II, substantial technical investigations were made into the use of impregnated carbons. The U.S. research in this area is summarized in "Military Problems with Aerosols and Nonpersistent Gases", Chapter 4: "Impregnation of Charcoal", by Grabenstetter, R. J., and Blacet, F. E., Division 10 Report of US National Defense Research Committee (1946) pp.40-87. This report provides in depth coverage of a number of impregnant formulations.

The United Kingdom pursued a slightly different impregnation approach. There, copper oxide was mixed with coal prior to carbonization and activation, so that the activated carbon contained metallic copper distributed throughout its structure. This material was the basis for the filter carbons used in World War II.

The ability of the carbon to remove cyanogen chloride (CK) was improved by the application of the amine pyridine or, separately, by impregnation with chromium in the form of sodium dichromate. This form of carbon, in combination with a pyridine impregnant, was used in military respirator filters manufactured in the 1970s.

Post World War II research has explored how the addition of organic compounds to impregnated carbon could improve the shelf life. Experiments were undertaken in the UK, France and elsewhere with various amines. One such material found to improve the shelf life towards cyanogen chloride is triethylenediamine (also known by other names such as TEDA, DABCO, or 1,4-diazabicyclo-2,2,2-octane). When impregnated on carbon, TEDA has been found in its own right to be capable of reacting directly with cyanogen chloride and is also highly capable of removing methyl bromide and methyl iodide. TEDA is strongly adsorbed onto carbon, is stable, is effective at low levels, and has minimal toxicity compared with other amine compounds. TEDA is a solid at room temperature, but sublimes readily.

Chromium has traditionally been used as a carbon impregnant in military applications, as it facilitates the satisfactory removal of hydrogen cyanide and cyanogen chloride (CK). Because the hexavalent ionic form of chromium has been identified as a potential lung carcinogen, work undertaken in recent times and dating back to the early 1970's has explored formulations that avoid or reduce the level of chromate salts as impregnants.

In recent times, the traditional role of military forces has changed from a more or less predictable battlefield conflict to encompass peace-making and peace-keeping roles, and supporting civilian authorities in emergency response. Such activities may involve responding to the release of chemicals by accident or intent. Intentional release of chemicals, referred to as "chemical terrorism", has occurred in fact and been threatened numerous times. These incidents may involve chemicals that have been traditionally regarded as military threats or may involve hazardous chemicals normally used in industry. The response to these hazards is ultimately likely to involve both civilian and military authorities and is likely to require protection systems that meet industrial approvals as well as military performance requirements.

Filtration-based protection systems are appropriate for personnel undertaking various tasks at some distance from a point of chemical release. For such cases, it is most desirable to be able to respond to a hazard quickly and without delay. Conventionally, however, delay may be inevitable as it may be necessary to first identify a threat in order to select an appropriate filter. In order to be able to respond to a wide range of possible hazards, it has been necessary to carry inventories of many different kinds of filters. It would be much more desirable to have one filter type that can provide protection against many different hazards. Such a multipurpose filter desirably would accommodate both industrial and military needs.

U.S. Pat. No. 5,492,882 describes filter medium particles impregnated with Cu compounds, Zn compounds, ammonium sulfate, moisture, molybdenum compounds, and other agents in some embodiments. The molybdenum compounds tend to be strongly acidic and are used to help protect against not just HCN and cyanogen chloride (CK), but also basic gases such as ammonia. However, Mo is used in these formulations at relatively high weight loadings, occupying greater portions of the substrate particles that might otherwise be available for other impregnants were Mo to be efficacious and/or used at lower loadings. Mo compounds tend to be strongly acidic, limiting formulation flexibility to co-impregnants whose functionality is not unduly impaired by the acidic character of Mo compounds. Mo is also quite expensive by comparison.

Yet, merely reducing or eliminating the Mo in a formulation is not a simple task. The significant challenge is to find a way to reduce or eliminate Mo while still providing protection against not just HCN and CK, but also ammonia and other basic contaminants.

SUMMARY OF THE INVENTION

The present invention provides filtering systems with very broad filtering capabilities. The present invention provides filter systems that are effective against a broad range of contaminants including HCN, cyanogen chloride (CK), acid contaminants. and basic contaminants such as ammonia without the need (but with the option, if desired) for using molybdenum or chromium containing materials. Conventional formulations have tended to require the use of Mo materials (or more toxic materials containing Cr) to attain satisfactory performance against both ammonia and HCN. Having the option to eliminate Mo from a formulation provides greater formulation flexibility (inasmuch as Mo is strongly acidic) and avoids the high costs associated with Mo.

The filtering systems are particularly suitable for primary application in personal respiratory protection to remove a broad range of toxic gases and vapors as found in industrial environments and also chemicals used as chemical warfare agents. The filtering systems successfully achieve performance levels mandated both by applicable industrial filter approval specifications and by internationally recognized military filter performance specifications. The present invention preferably relates to treatments applied to activated carbon in order to improve the ability of the activated carbon to remove low boiling point toxic gases. In preferred applications, the resultant filtering systems are used to filter breathing air in connection with respiratory protective equipment. However, the utility of the present invention is not limited to respiratory protective equipment, but also can be used for purifying air or other gases in connection with industrial processes.

The broad capabilities of the filtering systems allow construction of filters which can be used in a wide variety of applications, including being fitted onto a face-mask, or being fitted singly or in multiples onto a powered air purifying respirator system. One such powered system is commercially available under the trademark "BREATHE-EASY" from the Minnesota Mining and Manufacturing Company (3M).

Advantageously, the filtering systems provide not only broad spectrum filtering performance, but do so while being compact and convenient to use. For example, filtering media of the present invention may be incorporated into the same housings and canisters as are being used in current, commercially available filter systems. Broad spectrum performance and convenience are achieved while also maintaining excellent air flow characteristics. Airflow resistance of the present filtering media easily meet current industrial and military specifications.

Because of the broad spectrum filtering characteristics, the filtering systems of the present invention allow personnel to respond to and be involved in ancillary activities associated with chemical incidents in which the precise type of chemical present is not known or predictable ahead of time. This response flexibility avoids the need to maintain a large inventory of different filters. In many circumstances, the use of the filter systems allows responsive action to be taken without delay, because the broad spectrum protection provided by the filtering systems can reduce the urgency first to analyze the chemical(s) at issue, identify the chemicals, then select an appropriate filter, and only then respond to the hazard.

Preferably, the filtering systems of the present invention include a tungsten-based material and other impregnants incorporated into a substrate such as filter media particles. These substrates may be used by themselves or in combination with other filter materials. For instance, the tungsten material-containing particles may be intermixed, layer-loaded, or otherwise used in combination with a high efficiency particulate filter medium in order to provide combined protection against gas, vapor and particulate contamination. As another example, the tungsten material-containing particles may be intermixed, layer-loaded, or otherwise used in combination with filter medium particles constituting so-called Class B filter materials as defined by the European Committee for Standardization (CEN).

In one aspect, the present invention relates to a filter system, comprising an extended surface area substrate. A first impregnant comprising tungsten-containing material is provided on the substrate in an amount effective to help provide the filter medium with a filtering efficacy against an HCN contaminant. A second impregnant on the filter medium particles is provided in an amount effective to help provide the filter medium with a filtering efficacy against a basic contaminant. A third impregnant is provided on the substrate in an amount effective to help provide the filter medium with a filtering efficacy against an acidic contaminant.

In another aspect, the present invention relates to a filter medium. The filter medium comprises a substrate. A copper-containing impregnant is provided on the substrate in an amount effective to help provide the filter medium with a filtering efficacy against an acidic contaminant. A tungsten-containing impregnant is provided on the substrate in an amount effective to help provide the filter medium with a filtering efficacy against an HCN contaminant. An acidic, sulfate-containing impregnant is provided on the substrate in an amount effective to help provide the filter medium with a filtering efficacy against a basic contaminant.

In another aspect, the present invention relates to a method of making a filter medium. The method includes steps of causing ingredients comprising singly or in combination a carbonate, a sulfate, a hydroxide, a copper-containing material, and a tungsten-containing material to be incorporated into one or more admixtures, wherein at least one of the ingredients comprises an ammonium constituent. The one or more admixtures are caused to impregnatingly contact a substrate, whereby an impregnated substrate is formed. The impregnated substrate is dried, wherein at least a portion of the drying occurs in a vacuum and at least a portion of the drying occurs at a temperature sufficiently high such that an acidic sulfate compound is formed on the substrate in situ.

In another aspect, the present invention relates to a method of making a filter medium. The method includes the steps of providing information indicative of how organic vapor performance of a filter medium correlates to an amount of HCN-removing impregnant provided on the filter medium. The information is used to make a filter medium comprising an amount of the HCN-removing impregnant.

In another aspect, the present invention relates to a method of making a filter medium. The method includes the steps of providing information indicative of the efficacy of an HCN-removing impregnant as a function of the moles of the agent used per unit of a substrate. The information is used to make a filter medium comprising an amount of the HCN-removing impregnant impregnated onto the substrate.

DETAILED DESCRIPTION OF THE PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Filter systems of the present invention generally include a filter medium that includes an extended surface area substrate impregnated with, or otherwise treated to incorporate, an advantageous combination of impregnants (described further below) that provide filtering efficacies against a variety of contaminants including hydrogen cyanide, cyanogen chloride, acid contaminants, basic contaminants, organic vapor, and the like. The invention achieves this broad performance without the necessity (but with the option, if desired) to resort to using Mo or Cr. The term "filtering efficacy" generally means that filter media incorporating an impregnant have a greater capacity to remove a designated contaminant from a gas composition as compared to otherwise identical media that lack the impregnant. In preferred embodiments, filtering efficacy means that the impregnant is able to provide filtering protection against a designated contaminant in accordance with a desired governmental regulation, such as NIOSH standards in the United States and/or CEN standards in Europe. An impregnant may have such a filtering efficacy either by itself and/or when used in combination with one or more other impregnant(s).

The term "extended surface area substrate" means a substrate in which the surface is sufficiently convoluted or porous, preferably at a microscopic and/or macroscopic level, such that the substrate is capable of being impregnated with at least about 0.5%, preferably at least about 3%, more preferably at least about 5% or more by weight on a cumulative basis of at least the first, second and third impregnants described further below. Examples include woven or nonwoven fabric, bonded, fused, or sintered block, extended surface area particles, and/or the like. Extended surface area particles are preferred. Suitable extended surface area substrate particles tend to have BET specific surface areas of at least about 85 $m^2/g$, more typically at least about 500 $m^2/g$ to 2000 $m^2/g$, and preferably about 900 $m^2/g$ to about 1500 $m^2/g$. In the practice of the present invention, BET specific surface area of particles may be determined by the procedure described in ISO 9277:1995, incorporated herein by reference in its entirety.

Representative examples of extended surface area substrate particles include activated carbon, zeolite, alumina, silica, catalyst supports, combinations of these, and the like. The substrate particles used as a host for the impregnants may be the same or different. Activated carbon particles are presently a preferred constituent of at least a portion, and more preferably at least substantially all of the extended surface area substrate particles. Suitable activated carbon particles may be derived from a wide variety of source(s) including coal, coconut, peat, any activated carbon(s) from any source(s), combinations of at least two of these, and/or the like.

The substrate particles preferably may have microporous, mesoporous, and/or macroporous characteristics as such are defined in applicable provisions of IUPAC Compendium of Chemical Technology, 2d edition (1997). A typical population of activated carbon substrate particles will tend to include a combination of microporous mesoporous, and macroporous properties. Preferably, at least a portion of the substrate particles of the present invention are macroporous, especially with respect to embodiments in which the filter media particles are formed by a method comprising the steps of solution impregnation followed by a vacuum treatment. In such embodiments, the impregnants are able to impregnate more thoroughly and completely into the pore structure of the substrate particles.

The extended surface area substrate particles may have any of a wide range of sizes. Substrate particle size in the filter industry generally is expressed in terms of a mesh size. A typical expression for mesh size is given by "a×b", wherein "a" refers to a mesh density through which substantially all of the particles would fall through, and "b" refers to a mesh density that is sufficiently high so as to retain substantially all of the particles. For example, a mesh size of 12×30 means that substantially all of the particles would fall through a mesh having a mesh density of 12 wires per inch, and substantially all of the particles would be retained by a mesh density having a density of 30 wires per inch. Filter particles characterized by a mesh size of 12×30 would include a population of particles having a diameter in the range from about 0.5 mm to about 1.5 mm.

Selecting an appropriate mesh size for the substrate particles involves balancing density and filter capacity against air flow resistance. Generally, a finer mesh size (i.e., smaller particles) tends to provide not only greater density and filter capacity, but higher air flow resistance. Balancing these concerns, "a" is typically in the range of 5 to 20 and "b" is typically 15 to about 40 with the proviso that the difference between a and b is generally in the range from about 5 to about 30. Specific mesh sizes found to be suitable in the practice of the present invention include 12×20, 12×30, and 12×40.

To obtain filter media particles of the present invention, at least three kinds of impregnants are impregnated onto or otherwise incorporated into the substrate particles. A first impregnant comprises a tungsten-containing material. The tungsten-containing material helps to provide a filtering efficacy against contaminants such as HCN and cyanogen chloride (CK). Also, the tungsten-containing material tends to be only mildly acidic. The tungsten-containing material also helps to provide a filtering efficacy against basic contaminants such as ammonia or the like. Tungsten-containing materials also provide comparable protection against HCN and/or CK at lower molar weight loadings than have been conventionally used with respect to chromium and/or molybdenum-based impregnants.

The tungsten-containing material may be supplied in a variety of different form(s), but is conveniently supplied as a tungstate salt as these are available from commercial sources. Specific examples of such salts include ammonium meta tungstate and ammonium para tungstate. While the exact chemical composition of ammonium meta tungstate is not known for sure, this salt has been identified in the technical literature as having the formula $(NH_4)_6(H_2W_{12}O_{40}) \cdot 4H_2O$. Ammonium para tungstate has been identified in the literature as having the formula $(NH_4)_6(H_2W_{12}O_{42}) \cdot 4H_2O$. Meta tungstate with one or more appropriate counterions is more preferred relative to para tungstate salts inasmuch as less ammonia by-product is generated during manufacture of the particles. The meta form also is more soluble in aqueous solution. Additionally, the meta tungstate provides longer-lasting protection against HCN at comparable weight loadings.

The amount of tungsten-containing material impregnated onto the substrate particles may vary over a wide range. If too little is used, the protection against CK, HCN, and/or $NH_3$ may not last as long as might be desired. On the other hand, as more of the tungsten-containing material is used, there comes a point at which adding additional material provides little if any added protection. Using too much of the impregnant could also use up portions of the substrate particles that could beneficially be occupied by one or more other impregnants. Balancing these concerns, representative embodiments of the invention incorporate 0.5 to 10, more preferably 3 to 6 parts by weight of tungsten-containing material per 100 parts by weight of the substrate particles.

In some embodiments, it is more advantageous to determine the appropriate loading of tungsten-containing material, or any other impregnant(s) on a molar basis. This is particularly the case for tungstate salts, which contain many other elemental constituents in addition to tungsten. It is a distinct advantage of tungsten-containing materials that these can provide excellent protection against desired contaminants at relatively lower molar loadings. For instance, it has been determined that filter media particles containing only about 0.001 mol tungsten/g of substrate particles provide practically the same filtering efficacy against HCN as otherwise identical filter media particles containing about 0.08 mol/g of molybdenum.

Thus, the present invention further provides a methodology for correlating HCN performance to molar loadings, and then using the correlation to help better formulate filter medium particles. Specifically, information is obtained, typically experimentally, to determine how HCN protection varies with changes in the molar loading of one or more impregnants having or under investigation as having a filtering efficacy against HCN. This information is then used to make filter media particles having an amount of the impregnant corresponding to a desired level of HCN protection. Using this methodology, it has been determined that, in preferred embodiments of the invention, filter media particles comprise less than about 0.025, more preferably less than about 0.015 moles tungsten per gram of substrate particles most preferably from about 0.0001 to about 0.02 mole tungsten per gram substrate particles.

The present invention further involves an appreciation that the organic vapor protection provided by filter media particles correlates to an amount of HCN-removing impregnant provided on or otherwise incorporated into the particles. Specifically, depending upon the nature of the HCN-removing impregnant, performance against organic vapors can generally increase and/or decrease with increasing HCN-removing impregnant in weight loading regimes of interest. Thus, information may be provided, typically obtained initially experimentally, to determine how organic vapor protection varies with changes in the molar loading of one or more impregnants having a filtering efficacy against HCN. This information is then used to make filter media particles having a desired amount of the HCN-removing impregnant, e.g., an amount that balances desired levels of organic vapor and HCN protection.

A second impregnant is also used in the practice of the present invention. The second impregnant is one or more materials that have filtering efficacy against basic contaminants. Ammonia, for instance, is a typical basic contaminant for which protection is sought. A wide variety of such agents are known and include acidic materials such as bisulfate, sulfamic acid, zinc chloride, combinations of these, and the like. It should be noted that preferred embodiments of the second impregnant include acidic materials while preferred embodiments of the third impregnant (described below) include basic materials. It can be technically challenging to incorporate both acidic and basic impregnants onto the same substrate particles when using preferred solution impregnation techniques. To overcome this challenge, the present invention uses a preferred methodology in which precursor(s) of the desired second and/or third impregnant(s) are impregnated onto the particles initially and then subsequently converted into the desired impregnant in situ. Consequently, both acidic and basic impregnants are able to functionally co-exist on the same substrate particles.

Ammonium sulfate, a neutral salt, is an example of a preferred precursor that can be converted into an acidic material in situ. Ammonium sulfate, for instance, when impregnated on a substrate such as carbon particles and then dried and thermally treated, e.g., heated at about 140° C. to about 450° C., preferably at about 190° C. to 200° C. for a time period of 5 minutes to 50 hours, preferably 18 hours to 20 hours, is converted into an acidic material believed to include acid bisulfate. Bisulfate is sufficiently acidic to react with ammonia to facilitate removal of ammonia contamination from a flow of air or other gas. This results in enhanced ammonia service life of a cartridge containing the resultant impregnated carbon. Advantageously, the in situ formation of the strongly acidic bisulfate avoids undue degradation or damage to the basic oxide/hydroxide impregnant also present and/or also being formed in situ during the thermal treatment. The presence of ammonium salts in the impregnating solution also helps to improve the performance of the filter against toxic formaldehyde vapor in the air stream. Sulfate materials also are believed to help to control the pH during usage of filter media. Representative filter media particles may include 0.1 to 10, preferably 2.5 to 4.5 weight percent of sulfate containing material, as precursor and/or desired impregnant.

The desired heating conditions will depend upon factors including the equipment and atmosphere in which heating occurs. For example, in a vacuum and/or inert atmosphere, higher temperatures may be used. In air, lower heating temperatures may be used to stay below the ignition temperature of the particles.

A third impregnant is also used in the practice of the present invention. The third impregnant is one or more materials that have filtering efficacy against acidic contaminants. A wide variety of such agents are known and include copper-containing materials, moisture, potassium carbonate; potassium bicarbonate, combinations of these, and the like. One or more copper containing materials are preferred as at least a portion of the third impregnant. Cu-containing material(s) tend to be basic in nature and help to filter many gases such as HCN, $H_2S$, acid gases, and the like from air streams. The copper may be supplied as a salt, oxide, hydroxide, metal, or other compound. Preferably, the copper is supplied as a salt and then at least partially converted into a more basic compound, such as an oxide and/or hydroxide, in situ via thermal treatment for the same reasons as noted above with respect to ammonium sulfate. Representative filter media particles may include 0.1 to 15 weight percent of one or more impregnants including copper.

In the practice of the present invention, the acidic and/or basic characteristic of a impregnant may be determined by dissolving 0.1 g to 5 g of the impregnant in 100 g water and measuring the pH if the impregnant is water soluble. The impregnant is acidic if the pH of the solution is below 7, more preferably below about 6, more preferably below about 5. If not water soluble, the impregnant can be reacted with an acid and then with a base, respectively. If reactive with an acid, the impregnant is deemed to be basic. If reactive with a base, the impregnant is deemed to be acidic. If reactive with both acid and base, the impregnant is amphoteric and can fulfill a dual role in the efficacy against both acid and base contaminants. As used herein, "reactive" with an acid or base means that reacting about stoichiometric amounts of the materials at a suitable, respective concentration in the range of 0.01 M to 0.5 M in a suitable solvent at about ambient temperature proceeds at least 10%, more preferably at least 50% to completion.

In addition to the first, second, and third impregnants described above, one or more additional impregnants may also be used. As one option, one or more additional impregnants having an efficacy against HCN, CK, and/or the like may be used in combination with the tungsten containing material. Examples of such agents include compounds and/or salts containing Cr, V, Mo, combinations of these, and/or the like. These optional impregnants may be supplied in metallic form, but more typically are impregnated as salts, oxides, hydroxides, or the like. If used, the weight ratio of tungsten containing material to each of such other HCN-removing impregnants, respectively, preferably is in the range of 100:1 to 1:100, preferably 20:1 to 1:20, more preferably 10:1 to 1:10.

However, because the hexavalent form of Cr has been identified as a potential carcinogen, the filter media particles preferably include no detectable amounts of Cr (VI), and more preferably no detectable Cr of any valence state due to the risk that other forms of Cr, e.g., Cr (III) could be oxidized to Cr (VI). Vanadium is also associated with toxicity concerns. Accordingly, the filter media particles preferably include no detectable amounts of vanadium of any valent state. Molybdenum materials tend to be relatively strongly acidic compared to tungsten materials. Accordingly, the filter media particles preferably include no detectable amounts of molybdenum of any valent state. Particularly preferred embodiments contain no detectable amounts of molybdenum, vanadium, and Cr. As used herein, a metal such as Cr, vanadium, or molybdenum will be deemed to be not detectable if less than 0.01 g/gram substrate particles, preferably 0.001 g/gram substrate particles, more preferably 0.0001 g/gram substrate particles are present. Consequently, such materials may still be not detectable even if trace amounts of such materials may be present as impurities. In the present invention, the amount, if any, of such materials present may be determined using elemental analysis, e.g., atomic absorption, techniques.

Other optional impregnants that may be used include one or more impregnants comprising other transition metal(s). Examples of such impregnant materials include materials containing Zn, Ag, Ni, Co, combinations thereof, and the like. The selection of which of such one or more other transition metal impregnants to incorporate into the first plurality of filter media particles depends upon the desired range of filtering capabilities inasmuch as each of the various transition metals tend to provide protection against particular air contaminants. Zn in various forms tends to help filter HCN, cyanogen chloride, cyanogen, and $NH_3$ from air streams. Representative filter media particles of the present invention may include 1 to 20 weight percent of one or more impregnants including Zn. Ag tends to help filter arsenical gases from an air stream. Ag functions catalytically and generally is not consumed during filtering operations. Accordingly, filter media particles may include relatively small catalytic amounts, e.g., about 0.01 to 1, preferably 0.1 weight percent, of one or more Ag-containing impregnants. Ni and Co each independently helps to filter HCN from air streams. Representative filter media particles may include 0.1 to 15 weight percent of one or more Ni containing impregnants and/or Co containing impregnants, respectively.

In addition to one or more impregnants that contain transition metals, the filter media particles may optionally include one or more other kinds of impregnants. For example, one or more amine functional impregnants may be beneficially incorporated into the second plurality of filter media particles. Suitable amines may be monomeric, oligomeric, or polymeric. As used herein, the term "monomer" means a polymerizable molecule that forms a basic repeating unit in a polymer chain. "Oligomer" refers to a polymerized compound whose backbone is formed from 2 to 10 monomers. "Polymer" refers to a polymerized compound whose backbone is formed from more than 10 monomers.

Preferred amines are either a solid or liquid at room temperature. Preferred amines provide CK, methyl bromide, and/or methyl iodide removal capability. Representative examples of suitable amines include triethylenediamine (TEDA), triethylamine (TEA), pyridine, pyridine-4-carboxylic acid (P4CA), combinations of these, and the like. Of these, TEDA is most preferred.

The amount of amine incorporated into the filter media particles may vary within a wide range. Generally, if too little is used, the CK lifetime of the resultant media may be below what is desired. Additionally, if too little amine is used, a synergistic boost in filtering capabilities (e.g., organic vapor, CK, and ammonia lifetime), may not be observed when used in combination with other kinds of impregnants and/or filter media particles. On the other hand, using too much amine may tend to degrade unduly the capacity of the filter media particles to remove organic vapors from air or other gases. Additionally, above some impregnation level, little additional benefit may be observed by the use of more amine. Balancing these concerns, the second plurality of filter media particles generally comprises 0.5 to 15, more preferably 1 to 5 weight percent of amine based upon the total weight of the impregnated filter media particles.

Water may be a desirable, optional impregnant in some embodiments. Water impregnant provides an increased filtering efficacy against acid gases, ammonia, and the like. When present, 0.2 to 10, preferably 1 to 5, weight percent water would be suitable based upon the total weight of the impregnated filter media particles. Other suitable impregnants are described in Military Problems with Aerosols and Nonpersistent gases, Summary Technical Report of Division 10, NDRC (1946), the entirety of which is incorporated herein by reference.

When impregnated onto the substrate particles, the initial form of any of the impregnant(s) may or may not be chemically altered during the course of fabrication. For instance, if the fabrication process involves a thermal drying treatment after solution impregnation, one or more of the impregnants may be chemically converted into other compounds. For instance, some or all of a copper salt may be converted to a copper oxide, copper hydroxide, or other copper compound as a consequence of thermal treatment. As another example, ammonium sulfate salt advantageously is believed to be converted into ammonium bisulfate in situ, helping to provide filtering protection against basic contaminants such as ammonia. Impregnants may be incorporated into the first plurality of substrate particles in accordance with conventional practices. Such impregnants are typically provided as salts, oxides, carbonates, or the like and are impregnated via solution processing, sublimation processing, fluidized bed processing, and the like. Representative techniques for such processing have been widely described in the literature, including the patent and literature documents cited in the Background section herein.

If a desired kind of amine-impregnated filter media particle is not commercially available, a variety of techniques are available for impregnating an amine onto extended surface area particles. These include, for example, solution impregnation, a fluidized bed method (Ro et. al, U.S. Pat. No. 5,792,720), and a low pressure sublimation method (Liang et. al. U.S. Pat. No. 5,145,820). When a solid such as TEDA is to be impregnated onto substrate particles that already include other impregnants, solution impregnation can wash away the other impregnants. To avoid loss of the other impregnants, impregnation in such circumstances is preferably carried out using sublimation techniques as described in WO 02/092223 A1, incorporated herein by reference in its entirety.

According to a particularly preferred approach for making filter media particles of the present invention, 10 to 500, preferably 200 to 350, more preferably about 320 parts by weight of concentrated ammonium hydroxide solution (about 30 weight percent ammonia), 10 to 500, preferably 100 to 200, more preferably about 170 parts by weight of ammonium carbonate, and 10 to 500, preferably 100 to 200, more preferably about 180 parts by weight of ammonium sulfate are dissolved in about 300 to 10,000, preferably 400 to 1000, more preferably 400 to 600 parts by weight of distilled water with mixing. When the solution is clear, about 10 to 500, preferably 200 to 350, more preferably about 230 parts by weight of basic copper carbonate, $Cu\,CO_3.Cu(OH)_2$ is added with mixing until the solution is again free of undissolved particles. This preferably may be accomplished in about 30 to about 50 minutes. When the basic copper carbonate is fully dissolved, an additional 50 to 1000, preferably 310 to 210 parts by weight of distilled water is added. Note that the copper salt preferably is dissolved prior to adding tungsten or other transition metal salts. Dissolution of copper salt is easier if this order of addition is followed.

Next, the tungsten and other transition metal containing salts are added to the admixture. These may be added together or sequentially. Preferably, the tungsten containing salt may be added sequentially after other transition metal salts are added. For instance, if a formulation contains zinc chloride and ammonium (meta and/or para) tungstate, the zinc chloride may be added first. A representative formulation may contain about 1 to about 500, preferably 5 to 50 parts by weight of tungstate and 0 to about 15, preferably 1 to about 5 parts by weight of a zinc salt per 500 to 2000 parts by weight of the admixture. After adding these salts, mixing occurs until the salts dissolve. This may be accomplished in one embodiment in about one hour.

Next, 500 to 2000, preferably 750 to 1000, preferably about 900 parts by weight of substrate particles per 500 to 2000 parts by weight of admixture are placed into a suitable vessel such as a rotary conical vacuum dryer, which can rotate to facilitate thorough impregnation. The admixture is also placed into the vessel. The contents are rotated slowly, e.g., at 0.5 to 60, preferably 1 to 10 rpm for a sufficient soaking duration such as 5 to 60, more preferably about 30 minutes. After soaking, rotation is continued and the drying process is initiated for a sufficient duration and temperature. In one embodiment, drying occurs for about 16 to about 18 hours at a temperature of about 360° F. Under these conditions, the particles are dried. In the course of drying, ammonium sulfate is converted into an acidic species, while the copper salt is converted into a basic species.

After the drying treatment, the contents of the vessel are cooled. In one embodiment, the temperature of the vessel is reduced to 60° F. to accomplish cooling. When the batch is sufficiently cool, e.g., at a temperature at or below about 125° F., the resultant filter media particles may be removed from the vessel. If TEDA is a desired impregnant, TEDA could thereafter be added via sublimation as noted above.

Using the particularly preferred methodology described below, one representative embodiment of filter media particles of the present invention is formed by soaking substrate particles in one or more impregnation solutions comprising ammonium carbonate, ammonium sulfate, ammonium hydroxide, basic copper carbonate, ammonium meta tungstate, optionally a zinc salt, and optionally TEDA. After soaking, the impregnated particles are dried. Preferably, at least a portion of the drying occurs in a vacuum and/or at elevated temperature.

Using the particularly preferred methodology described below, another representative embodiment of filter media particles of the present invention is formed by soaking substrate particles in one or more impregnation solutions comprising ammonium carbonate, ammonium sulfate, ammonium hydroxide, basic copper carbonate, ammonium para tungstate, optionally a zinc salt, and optionally TEDA. After soaking, the impregnated particles are dried. Preferably, at least a portion of the drying occurs in a vacuum and/or at elevated temperature.

Using the particularly preferred methodology described below, another representative embodiment of filter media particles of the present invention is formed by soaking substrate particles in one or more impregnation solutions comprising ammonium carbonate, ammonium sulfate, ammonium hydroxide, basic copper carbonate, ammonium para tungstate, ammonium vanadate, optionally a zinc salt, and optionally TEDA. After soaking, the impregnated particles are dried. Preferably, at least a portion of the drying occurs in a vacuum and/or at elevated temperature.

In addition to the first filter media particles that include at least three kinds of impregnants as described herein, filter media systems of the present invention may further include one or more other kinds of filter media particles such as those described in U.S. Pat. Nos. 5,344,626; 5,496,785. Such additional filter media particles may be intermixed and/or disposed in separate filter bed layers that are operatively positioned so that a fluid stream conveyed through the system contacts each filter bed. If disposed in separate filter bed layers, the one or more additional filter media particles may be positioned upstream or downstream from the first filter media particles described above. In a particularly preferred embodiment, the filter system of the present invention incorporates at least the first filter media particles into a first filter bed and at least Class B filter media particles are incorporated in a second filter bed. Such second filter bed is preferably positioned upstream from the first filter bed for heightened HCN protection.

The relative amounts of filter media particles and the Class B filter media particles can vary over a wide range. As general guidelines, the ratio of the first plurality of filter media particles to the Class B plurality of filter media particles is in the range of 1:19 to 19:1, preferably 1:5 to 5:1, more preferably about 1:1.

The present invention will now be further described with reference to the following examples.

EXAMPLES AND TEST METHODS

Service Life

The time required for a gas challenge of a given constituent concentration and flow, to penetrate the sorbent bed of a respirator canister to a specified level, is called the service life of the respirator canister. Service life is an indication of the capacity of a sorbent, contained in a canister, to remove a constituent gas from the challenge. By monitoring the concentration of the constituent gas over time, as the challenge exits the canister, the adsorption capacity of the sorbent can be gauged. Service life testing of candidate sorbents, contained in respirator canisters, was conducted in accordance with the methods set forth in the United States Code of Federal Regulations Title 42, Volume 1, Oct. 1, 2002 revision, CHAPTER I PART 84—APPROVAL OF RESPIRATORY PROTECTIVE DEVICES, Subpart I—Gas Masks, section 84.126—Canister bench tests; minimum requirements (42CFR84.126). Gases used in the service life test include a basic gas challenge—ammonia $NH_3$, an acidic gas challenge—sulfur dioxide $SO_2$, an organic vapor gas challenge cyclohexane, and a military gas challenge—hydrogen cyanide HCN. Challenge concentrations were 1000 part per million (ppm) for the ammonia, 500 ppm for the sulfur dioxide, 1000 ppm for the cyclohexane, and 1000 ppm for the hydrogen cyanide. The carrier gas used with each challenge was air at a relative humidity (RH) of 50% except for the HCN challenge which was 70% RH. A total challenge flow rate of 32 liters per minute (lpm) was used for the evaluations except for the organic vapor challenge, which was 16 lpm, and the HCN challenge which was 30 lpm. The penetration, or breakthrough, concentration at the end of service life for each of the challenges was 50, 5, 5, and 10 ppm for the $NH_3$, $SO_2$, cyclohexane, and HCN respectively. Service life was reported in minutes to reach the breakthrough concentration.

Canisters used to evaluate a sorbent were cylindrical in shape and had an inside diameter of 8.25 cm. The bottom of the test canister was defined by a stainless steel #80 mesh retainer support that was placed so that a filled containment volume of 106 cm$^3$ could be provided. For an evaluation 106 cm$^3$ of sorbent was loaded into the canister; this resulted in a bed depth of 2.54 cm and bed bulk density of 0.6 g/cm$^3$. The face velocity of the challenge through the bed was maintained between 5-10 cm/sec depending on the specific gas test.

Conjugate Activity and Molar Efficiency Determination

Conjugate activity (CA) of a treated sorbent is a convenient comparative measure of sorbent performance. Conjugate activity is determined by summing the service life times (SLT) for individual challenges of a sorbent tested against a set of varied composition gases. Molar efficiency (ME) is a measure of the effectiveness of a treated sorbent relative to the add-on of an impregnated constituent(s). Molar efficiency is based on the relationship between conjugate activity of a treated sorbent and the molar loading, per unit weight of sorbent, of an impregnated material.

Conjugate Activity and Molar Efficiency are given as:

$$CA = \sum_{g=1,2,3\ldots n} SLT_g$$

$$ME = CA/SML$$

where:
Conjugate Activity, CA [=] min
Service Life Time for Gas g, $SLT_g$ [=] min
Sorbent Molar Loading, SML [=] mole/g
Molar Efficiency, ME [=] min·g/mole Example 1

An example of treated sorbent of the invention was produced by contacting an activated carbon with an impregnating solution and drying the mixture at elevated temperatures. Activated carbon, type 12×40 GAC, available from Norit Americas Inc., Pryor, Okla., via Univar Canada Ltd., Lachine PQ was used as the carrier for the sorbent treatments. The activated carbon also provided organic vapor adsorbent capacity for the sorbent. A solution for impregnation was prepared by mixing a base solution with an additional active component. The base solution had a composition of 18% ammonia, 11% ammonium carbonate $(NH_4)_2CO_3$, 11% ammonium sulfate $(NH_4)_2SO_4$, 45% deionized water, and 15% basic copper carbonate $CuCO_3 \cdot Cu(OH)_2$. Formulation of the impregnating solution was completed by dissolving 2 parts per hundred (pph by weight of the base solution) of ammonium metatungstate $(NH_4)_6(H_2W_{12}O_{40}).4H_2O$ into the base solution. To prepare the treated carbon, 3541 grams of the impregnating solution was charged, with 2000 grams of carbon, into a rotary conical vacuum drier, model 12RCVD rotacone, available from Paul O. Abbe Inc., Little Falls, N.J., 07424. The mixture was blended in the rotacone for 30 minutes at a rotation speed of 2 rpm. While rotating at 4 rpm the mixture was heated to a temperature of 182 C. and maintained at that temperature for 16 to 18 hours. After the heating stage the mixture was cooled to a temperature of 45 C. and discharged from the rotacone. The treated carbon was then configured into cartridges for evaluation as described in the Service Life test method. Results of service life testing with values of Conjugate Activity and Molar Efficiency, in addition to the gravimetrically determined sorbent molar loading of tungsten on the carbon, are given in Tables 2 and 1 respectively.

Example 2

Example 2 was prepared like Example 1 except that 1.5 pph ammonium vanadate $NH_4VO_3$ was blended with 1.5 pph of ammonium metatungstate $(NH_4)_6(H_2W_{12}O_{40}) \cdot 4H_2O$. Results of service life testing with values of Conjugate Activity and Molar Efficiency, in addition to the gravimetrically determined sorbent molar loading of vanadate and tungstate on the carbon, are given in Tables 2 and 1 respectively.

Example C1

A comparative example was prepared like Example 1 except that no ammonium metatungstate was added to the impregnating solution. Results of service life testing with the value of Conjugate Activity are given in Table 2.

Example C2

A comparative example was prepared like Example 1 except that 3 pph ammonium molybdate $(NH_4)_6Mo_7O_{24} \cdot 4H_2O$ was substituted for ammonium metatungstate $(NH_4)_6(H_2W_{12}O_4) \cdot 4H_2O$. Results of service life testing with values of Conjugate Activity and Molar Efficiency, in addition to the gravimetrically determined sorbent molar loading of molybdate on the carbon, are given in Tables 2 and 1 respectively.

Example C3

A comparative example was prepared like Example 1 except that 6 pph ammonium molybdate $(NH_4)_6Mo_7O_{24} \cdot 4H_2O$ was substituted for ammonium metatungstate $(NH_4)_6(H_2W_{12}O_{40}) \cdot 4H_2O$. Results of service life testing with values of Conjugate Activity and Molar Efficiency, in addition to the gravimetrically determined sorbent molar loading of molybdate on the carbon, are given in Tables 2 and 1 respectively.

Example C4

A comparative example was prepared like Example 1 except that 3 pph ammonium molybdate $(NH_4)_6Mo_7O_{24} \cdot 4H_2O$ and 1 pph zinc chloride $ZnCl2$ were substituted for ammonium metatungstate $(NH_4)_6(H_2W_{12}O_{40}) \cdot 4H_2O$. Results of service life testing with values of Conjugate Activity and Molar Efficiency, in addition to the gravimetrically determined sorbent molar loading of molybdate and zinc on the carbon, are given in Tables 2 and 1 respectively.

Example C5

A comparative example was prepared like Example 1 except that 3 pph ammonium vanadate $NH_4VO_3$ was substituted for ammonium metatungstate $(NH_4)_6(H_2W_{12}O_{40}) \cdot 4H_2O$. Results of service life testing with values of Conjugate Activity and Molar Efficiency, in addition to the gravimetrically determined sorbent molar loading of vanadate on the carbon, are given in Tables 2 and 1 respectively.

TABLE 1

| Example | Added Component | Sorbent Molar Loading (mole/g) |
| --- | --- | --- |
| 1 | tungsten | 0.000991 |
| 2 | tungsten + vanadate | 0.00568 |
| C1 | None | Not Applicable |
| C2 | molybdate | 0.0195 |
| C3 | molybdate | 0.5544 |
| C4 | molybdate + zinc | 0.0729 |
| C5 | vanadate | 0.238 |

TABLE 2

| | Service Life (min) | | | | Conjugate Activity | Molar Efficiency (min · g/min) |
| --- | --- | --- | --- | --- | --- | --- |
| Example | OV | HCN | $SO_2$ | $NH_3$ | (min) | $\times 10^{-4}$ |
| 1 | 35 | 55 | 50 | 64 | 204 | 20.6 |
| 2 | 26 | 53 | 55 | 66 | 200 | 3.52 |
| C1 | 49 | 2 | 42 | 63 | 156 | Not applicable |
| C2 | 48 | 79 | 45 | 71 | 243 | 1.3 |
| C3 | 25 | 64 | 27 | 95 | 211 | 0.04 |
| C4 | 28 | 72 | 43 | 63 | 206 | 0.28 |
| C5 | 22 | 57 | 33 | 69 | 181 | 0.08 |

As is evident from the results given in Table 2, the Molar Efficiency for the formulation of the invention employing tungsten as an active agent is more than ten times that of the best comparative formulation using well known treatment chemistries. It is also evident that when tungsten is blended with other active agents such as vanadate, as in Example 2, the Molar Efficiency of the combination is significantly improved over the use of that agent alone.

Example 3

Example 3 was prepared and evaluated like Example 1 except that 3 parts per hundred (pph by weight of the base solution) of ammonium paratungstate $(NH_4)_6(H_2W_{12}O_{42}) \cdot 4H_2O$ was blended into the base solution, this yielded a molar loading of 0.0089 mole/g onto the sorbent base. Service life of the impregnated sorbent was determined to be 12 minutes for a HCN challenge.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of making a filter medium, comprising the steps of:
   (a) causing ingredients comprising singly or in combination a carbonate, a sulfate, a basic material, a copper-containing material, and a tungsten-containing material to be incorporated into one or more admixtures, wherein at least one of the ingredients comprises an ammonium constituent;
   (b) causing the one or more admixtures to impregnatingly contact a substrate, whereby an impregnated substrate is formed;
   (c) drying the impregnated substrate, wherein at least a portion of the drying occurs in a vacuum and at least a portion of the drying occurs at a temperature sufficiently high such that an acidic sulfate compound is formed on the substrate in situ.

2. The method of claim 1, wherein at least a portion of the carbonate comprises ammonium carbonate.

3. The method of claim 1, wherein at least a portion of the sulfate comprises ammonium sulfate.

4. The method of claim 1, wherein at least a portion of the basic material comprises aqueous ammonia.

5. The method of claim 1, wherein at least a portion of the tungsten containing material comprises ammonium tungstate.

6. The method of claim 1, wherein at least a portion of the tungsten containing material comprises ammonium meta tungstate.

7. The method of claim 1, wherein at least a portion of the tungsten containing material comprises ammonium para tungstate.

8. The method of claim 1, wherein the substrate comprises a plurality of substrate particles and wherein the tungsten-containing material is present in an amount such that the moles of tungsten in the tungsten-containing material per gram of substrate particles is less than about 0.015.

* * * * *